(12) United States Patent
Xiang

(10) Patent No.: US 12,104,675 B1
(45) Date of Patent: Oct. 1, 2024

(54) FINELY-ADJUSTABLE CORD RETRACTING AND DEPLOYING DEVICE AND OBJECT

(71) Applicant: SHENZHEN ETIE TECHNOLOGY LTD., Shenzhen (CN)

(72) Inventor: Feng Xiang, Shenzhen (CN)

(73) Assignee: SHENZHEN ETIE TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 18/584,105

(22) Filed: Feb. 22, 2024

Related U.S. Application Data

(63) Continuation of application No. PCT/CN2024/075245, filed on Feb. 1, 2024.

(51) Int. Cl.
*F16G 11/12* (2006.01)
*A43C 1/00* (2006.01)

(52) U.S. Cl.
CPC ............... *F16G 11/12* (2013.01); *A43C 1/00* (2013.01)

(58) Field of Classification Search
CPC ......... F16G 11/12; A43C 1/00; A43C 11/165; A43C 11/20; Y10T 24/2183
See application file for complete search history.

(56) References Cited

U.S. PATENT DOCUMENTS

| 9,375,053 | B2* | 6/2016 | Burns | A43C 11/20 |
| 9,622,544 | B2* | 4/2017 | Chen | A43C 7/02 |
| 9,635,906 | B2* | 5/2017 | Midorikawa | A43C 11/165 |
| 9,717,305 | B2* | 8/2017 | Midorikawa | A43C 11/165 |
| 9,770,070 | B2* | 9/2017 | Cotterman | A43C 11/165 |
| 11,266,206 | B2* | 3/2022 | Chen | B65H 75/4471 |
| 11,492,228 | B2* | 11/2022 | Kruse | F16G 11/12 |
| 11,638,466 | B2* | 5/2023 | Burt | A43C 11/165 24/195 |
| 11,647,813 | B1* | 5/2023 | Rao | A43C 11/165 24/199 |
| 11,744,329 | B2* | 9/2023 | Ha | A43C 11/165 24/712.9 |
| 11,849,809 | B1* | 12/2023 | Xiang | B65H 75/4471 |
| 2019/0174869 | A1* | 6/2019 | Wang | B65H 75/26 |
| 2022/0142304 | A1* | 5/2022 | Chen | A43C 11/008 |
| 2023/0092419 | A1* | 3/2023 | Chen | A43C 11/22 24/712.2 |
| 2023/0354965 | A1* | 11/2023 | Kim | A43C 11/165 |
| 2024/0008598 | A1* | 1/2024 | Chen | A43B 13/04 |
| 2024/0032654 | A1* | 2/2024 | Chen | F16G 11/12 |

* cited by examiner

*Primary Examiner* — Robert Sandy
*Assistant Examiner* — Louis A Mercado
(74) *Attorney, Agent, or Firm* — Daniel M. Cohn; Howard M. Cohn

(57) ABSTRACT

A finely-adjustable cord retracting and deploying device includes a base, a reel, a pawl disk, a knob and a control member. The base includes a first accommodating chamber, a ratchet part, a first threading hole, and a second threading hole. The reel is provided with a winding region configured to store a cord. The pawl disk includes a pawl arm. The pawl arm can move along the ratchet part to control a length of retraction and deployment of a cord. The knob can drive the reel to rotate to retract or deploy the cord. The control member is arranged between the reel and the base. When the knob is turned, the control member can move between a bottom plate and a top plate to control a total length of retraction or deployment of the cord.

13 Claims, 14 Drawing Sheets

FINELY-ADJUSTABLE CORD RETRACTING AND DEPLOYING DEVICE AND OBJECT

CROSS-REFERENCE TO RELATED APPLICATIONS

The application is a continuation of International Application No. PCT/CN2024/075245 filed on Feb. 1, 2024.

TECHNICAL FIELD

The present disclosure relates to the technical field of cord retracting and deploying devices, and in particular, to a finely-adjustable cord retracting and deploying device and an object.

BACKGROUND

In order to make some articles of daily use suitable for different users, many articles of daily use are designed with drawstrings, such as sneakers, hats, sports shirts, and gloves. The tightness of a supply is adjusted by knotting the drawstring, but in daily life, the knotted drawstring is sometimes easily loosened and untied. If shoelaces are loosened, the shoelaces are easily stained, trip up people, and the like. Especially, kids cannot tie their shoes, and it is very inconvenient for old people to bend down and tie their shows because the old people are in poor health, which easily leads to danger.

Therefore, a cord retracting and deploying device has appeared on the market to retract and deploy cords. The cords can be tightened by turning a knob. However, this type of cord retracting and deploying device can only deploy the entire cord at once if the cord needs to be deployed, otherwise, the cord will get stuck inside a product. Therefore, it is impossible to control the length of retraction and deployment of the cord during use, so that this device is inconvenient to use when the cord needs to be precisely controlled.

However, some other cord retracting and deploying devices can finely adjust the retraction and deployment of the cord, but they cannot control a total length of retraction and deployment of the cord so that the cord gets stuck or is deadly pressed inside the product, and the product will fail to use.

Meanwhile, there are also a few of products that control the total length of the cord through a single rope but these products are complex in structure and high in production and assembling difficulty, leading to low production efficiency. As a result, the product has high cost and easily fails during operation, such as the cord being stuck or broken. The product has poor operation stability, so that use of this type of product is greatly limited.

SUMMARY

In view of this, it is necessary to provide a finely-adjustable cord retracting and deploying device that can control a total length of retraction and deployment of a cord, has a simpler structural design, and is easy to produce and assemble.

In the first aspect, the present disclosure provides a finely-adjustable cord retracting and deploying device, including:

- a base includes a bottom plate and a first side plate arranged on one side of the bottom plate, wherein the bottom plate and the first side plate are enclosed to form a first accommodating chamber; a ratchet part is arranged at one end of the first side plate away from the bottom plate; the ratchet part is annularly arranged on the first side plate and is located in the first accommodating chamber; the first side plate is provided with a first threading hole and a second threading hole which are configured to thread a cord; the second threading hole is communicated to the first accommodating chamber;
- a reel, provided with a winding region configured to store the cord, wherein the reel is arranged in the first accommodating chamber and is rotatably connected to the base;
- a pawl disk, arranged in the first accommodating chamber and connected to the reel, wherein the pawl disk includes a pawl arm; the pawl arm moves along the ratchet part to control a length of retraction and deployment of the cord; when the pawl arm resists against the ratchet part, the pawl disk and the reel are stationary relative to the base; when the pawl arm is separated from the ratchet part, the pawl disk and the reel rotate relative to the base;
- a knob, arranged on one side of the base facing the first accommodating chamber, rotatably connected to the base, and capable of being turned in a preset direction, wherein the knob includes a top plate and a first driving member arranged on one side of the top plate facing the base; the first driving member drives the pawl arm to be separated from the ratchet part and drives the reel to rotate relative to the base, so as to retract or deploy the cord into or from the winding region; and
- a control member, arranged between the reel and the base, wherein the reel is rotatably connected to the base through the control member; and when the knob is turned in the preset direction, the control member moves between the bottom plate and the top plate in a direction from the bottom plate to the top plate or from the top plate to the bottom plate, so as to limit a rotation distance of the reel and control the total length of the cord for retraction or deployment.

Compared with the prior art, the finely-adjustable cord retracting and deploying device provided by the present disclosure drives the reel to rotate relative to the base by turning the knob, thus retracting the cord into the winding region or deploying the cord from the winding region. The pawl arm and the ratchet part are arranged in a mutually resisting and matching manner, so that the rotation distance of the reel can be limited by the ratchet part during rotation, thereby precisely controlling the length of the cord retracted or deployed by the reel. That is, for each turning of the knob, the reel can retract or deploy the cord by a certain length. When the knob is continuously turned, the reel can continuously retract or deploy the cord. In addition, the control member is arranged between the reel and the base, and a total movement distance of the control member is limited by the bottom plate and the top plate, so as to control a total rotation distance of the reel relative to the base, thereby controlling a total length of the cord during retraction or deployment. This can prevent the cord from getting stuck or deadly pressed in the winding region when the cord is wound in the reel, so as to ensure smooth operation of the product every time the cord is retracted or deployed by a certain distance.

Further, in some embodiments, a fixed column is arranged on one side of the bottom plate facing the first accommodating chamber; a flange is arranged on the fixed column; the control member is provided with a first mounting hole and a limiting slot communicated to the first mounting hole; when the first mounting hole sleeves the fixed column, the flange is located in the limiting slot; the control member is further provided with an external thread; the reel includes a main body part; a second mounting hole provided with an internal thread is arranged on the main body part; the second mounting hole is screwed to the control member; and when the knob drives the reel to rotate relative to the base, the reel drives the control member to move in an axial direction of the fixed column. The control member is connected to the fixed column through the limiting slot and the flange, thereby limiting the rotation of the control member around the fixed column. Meanwhile, due to the fact that the control member is screwed to the reel, when the reel rotates around the fixed column, the control member can only move in the axial direction of fixed column. When the control member moves to the top plate or the bottom plate and cannot move, the reel is unable to rotate around the fixed column. In this case, the cord cannot be retracted or deployed, thus precisely controlling the total length of retraction or deployment of the cord. In addition, the control member using this structure has a simple structure and extremely high operation stability. The method for controlling the total length of the cord is simple, and the production process is also simple. Especially, rapid assembling can be achieved, the production costs are effectively reduced, and the competitiveness of the product is improved.

Further, in some embodiments, the reel further includes a first base plate arranged on the main body part and a second base plate spaced apart from the first base plate; the first base plate, the second base plate, and the main body part form the winding region; a third threading hole configured to fix one end of the cord is arranged on the main body part located in the winding region; the first thresholding hole fixes the other end of the cord; and the cord is retracted to the winding region or deployed from the winding region via the second threading hole. The first base plate and the second base plate form the winding region, which can control the cord in a retraction region of the reel. Meanwhile, the third threading hole for fixing the cord is arranged in the winding region, so that during the retraction of the cord, the cord can be directly retracted to the winding region.

Further, in some embodiments, the second base plate is located on the main body part between the first base plate and the bottom plate; the third threading hole passes through the main body part of the winding region and the first base plate; a second driving member is arranged on one side of the first base plate away from the second base plate; the first driving member is located on one side of the second driving member and resists against the first base plate; the pawl arm is located on one side of the first driving member away from the second driving member and resists against the first base plate; the preset direction includes a first direction and a second direction; when the knob is turned in the first direction, the first driving member resists against and drives the second driving member to drive the reel to rotate around the fixed column to retract the cord; when the knob is turned in the second direction, the first driving member resists against and drives the pawl arm to drive the reel to reversely rotate around the fixed column to deploy the cord; and when the knob is stopped being turned, the pawl arm resists against the ratchet part to limit the rotation of the reel. The third threading hole penetrates through the winding region and the first base plate, so that the knotted part for fixing the cord can be arranged on the first base plate, which effectively uses the space. By the arrangement of the second driving member, it is more convenient and quicker for the first driving member to drive the reel. Thus, turning the knob can drive the reel.

Further, in some embodiments, a third driving member is further arranged on one side of the first base plate away from the second base plate; the third driving member is arranged on one side of the pawl arm away from the first driving member; and when the knob is turned in the second direction, the first driving member resists against and drives the pawl arm, and the pawl arm is separated from the ratchet part, and resists against and drives the third driving member to drive the reel to reversely rotate around the fixed column to deploy the cord. By the arrangement of the third driving member, the first driving member can indirectly drive the third driving member by driving the pawl arm when the knob is turned in the second direction, thereby driving the reel to rotate in the second direction to deploy the cord. This can avoid damage to the pawl arm during the rotation in the second direction and prolong the service life of the product.

Further, in some embodiments, the pawl disk further includes a third base plate provided with a mounting port, an elastic arm connected to the third base plate, and a connecting part connected to one end of the elastic arm away from the third base plate and is provided with a positioning hole; the third base plate sleeves the main body part through the mounting port; the pawl arm is connected to one end of the connecting part away from the elastic arm; one side of the first base plate away from the second base plate is further provided with a positioning column; the positioning column is located between the second driving member and the third driving member; and the positioning hole sleeves the positioning column. By the arrangement of the third base plate provided with the mounting port, and the positioning column, it can ensure a stable connection between the pawl disk and the reel, and one of the reel and the pawl disk can push the other to rotate when driven. Meanwhile, the elastic arm can also enable the pawl arm to have certain elasticity, which can be separated from and resists against the ratchet part, thereby enabling the reel to rotate or remain stationary relative to the base.

Further, in some embodiments, a protruding part is further arranged on one side of the first base plate away from the second base plate; the protruding part resists against the pawl arm; the second driving member is arc-shaped; one end away from the first driving member is connected to the main body part; and the positioning column is arranged in an arc-shaped region of the second driving member. By the arrangement of the protruding part, a contact area between the pawl arm and the first base plate during deformation of the pawl arm can be reduced, thereby reducing a friction force. The positioning column is arranged in the arc-shaped region of the second driving member, so that the pawl disk is fixed more stably, avoiding its shaking from affecting the stability of the product.

Further, in some embodiments, the knob further includes a first limiting part arranged on one side of the top plate close to the bottom plate, and a second side plate arranged in a circumferential direction of the top plate; the top plate and the second side plate are enclosed to form a second accommodating chamber; the first driving member and the first limiting part are located in the second accommodating chamber; the first limiting part resists against the pawl arm; a second limiting part is arranged on one side of the second side plate facing the second accommodating chamber; the second limiting part, the second side plate, and the top plate form a clamping slot; a clamping part protruding out of the first side plate is further arranged on one side of the first side plate away from the first accommodating chamber; the clamping part is clamped with the clamping slot; the clamping part and the clamping slot slide relative to each other; a slope is further arranged on one side of the second limiting part away from the top plate; and an anti-skid structure is further arranged on one side of the second side plate away from the second accommodating chamber. The first limiting part resists against the pawl arm, which can prevent the pawl arm from shaking up and down and improve the stability during the rotation of the product. The clamping slot is clamped to the base, and the slope is arranged, which can facilitate the mounting of the product. Meanwhile, the relative rotation between the knob and the base can also be achieved. In addition, the anti-skid structure is arranged to facilitate the user to turn the knob, which improves the use experience.

Further, in some embodiments, the finely-adjustable cord retracting and deploying device further includes a fixing member; the fixing member includes a limiting plate and a screwing part arranged on one side of the limiting plate; the fixed column is provided with a fixing hole; the screwing part is arranged in the fixing hole in a penetrating manner; the limiting plate resists against one end of the fixed column away from the bottom plate; and when the knob is turned to drive the reel to rotate relative to the base, the reel drives the control member to move between the limiting plate and the bottom plate in an axial direction of the fixed column. The fixing member is connected to the fixed column, which limits the axial movements of both the reel and the pawl disk on the fixed column, so that the reel and the pawl disk can only rotate around the fixed column. Furthermore, the fixing member can also limit the movement of the control member only between the bottom plate and the fixing member, so as to avoid the influence of the control member on the top plate of the knob.

Further, in some embodiments, the finely-adjustable cord retracting and deploying device further includes a chassis; and the chassis is located on one side of the base away from the knob and is fixed to the base. By the arrangement of the chassis, the finely-adjustable cord retracting and deploying device can be fixed on an object that needs to be used, so as to better use the finely-adjustable cord retracting and deploying device.

In a second aspect, the present disclosure further provides a double-sided finely-adjustable cord retracting and deploying device, including the foregoing finely-adjustable cord retracting and deploying device, wherein the device includes two first threading holes and two second threading holes which are symmetrically arranged on the first side plate, so that the double-sided finely-adjustable cord retracting and deploying device simultaneously retracts or deploys the cord on two opposite sides. The two groups of the first threading holes and second threading holes are symmetrically arranged on the first side plate, so that two cords can be simultaneously arranged in a penetrating manner and are simultaneously retracted or deployed, and two kinds of objects can be simultaneously tightened or loosened.

In the third aspect, the present disclosure further provides an object, including a first part, a second part, and a cord, wherein the cord is configured to tighten or loosen the first part and the second part; the object further includes the foregoing finely-adjustable cord retracting and deploying device; and the finely-adjustable cord retracting and deploying device is configured to retract and/or deploy the cord. The object can be one of a shoe, a hat, a glove, a medical protective gear, a helmet, a retraction device, a skiing protective gear, a bag, and clothing. The object can also be another object that needs to be tightened or loosened with a cord.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

Figure 1:
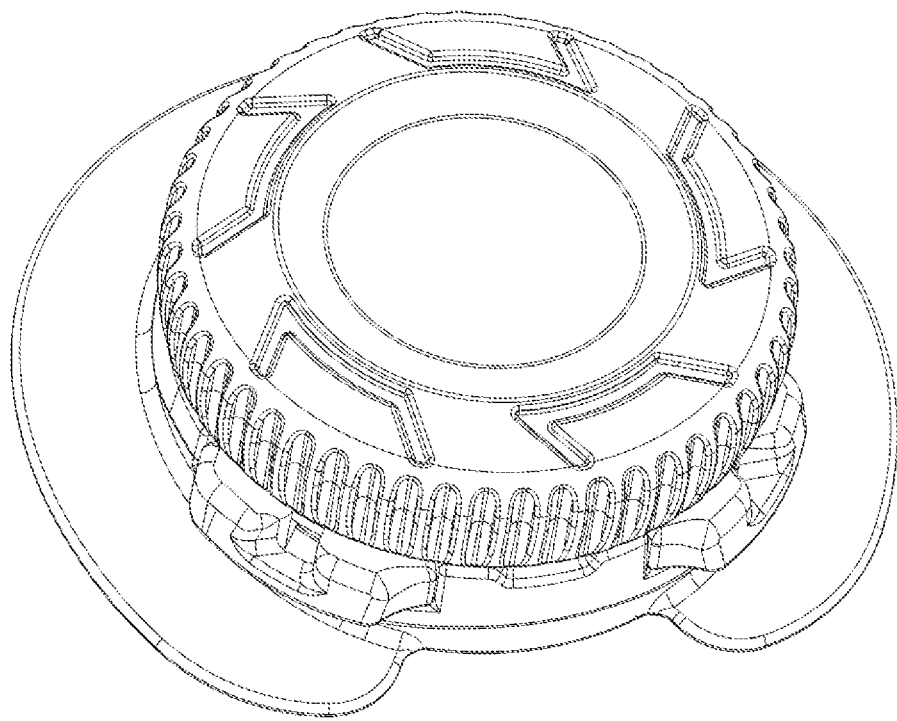
FIG. 1 is a three-dimensional diagram of a finely-adjustable cord retracting and deploying device shown in an embodiment of the present disclosure.

In order to facilitate understanding the present disclosure, the present disclosure will be described more comprehensively below with reference to related accompanying drawings. Preferred implementations of the present disclosure are provided in the drawings. However, the present disclosure can be implemented in many different forms, and are not limited to the implementations described herein. On the contrary, these implementations are provided to make the content disclosed in the present disclosure understood more thoroughly and comprehensively.

It should be noted that when an element is referred to as being "fixed to" another element, the element can be directly on another component or there can be a centered element. When an element is considered to be "connected" to another element, the element can be directly connected to another element or there may be a centered element. The terms "inner", "outer", "left", "right", and similar expressions used herein are for illustrative purposes only and do not necessarily represent the only implementation.

Unless otherwise defined, all technical and scientific terms used herein have the same meaning as those commonly understood by a person skilled in the art to which the present disclosure belongs. Terms used in the specification of the present disclosure herein are merely intended to describe objectives of the specific embodiments, but are not intended to limit the present disclosure. The term "and/or" used herein includes any and all combinations of one or more related listed items.

According to a first aspect, referring to FIG. 1, FIG. 1 is a three-dimensional diagram of a finely-adjustable cord retracting and deploying device 1 shown in an embodiment of the present disclosure. The finely-adjustable cord retracting and deploying device 1 according to the present disclosure can be applied to a shoe, a hat, a glove, a helmet, a medical protective gear, a retraction device, a skiing protective gear, and the like. This type of object can be tightened and loosened in conjunction with a cord. The finely-adjustable cord retracting and deploying device is easy and convenient to use, and is particularly used by old people, kids, and patients or used in special scenes.

Figure 2:
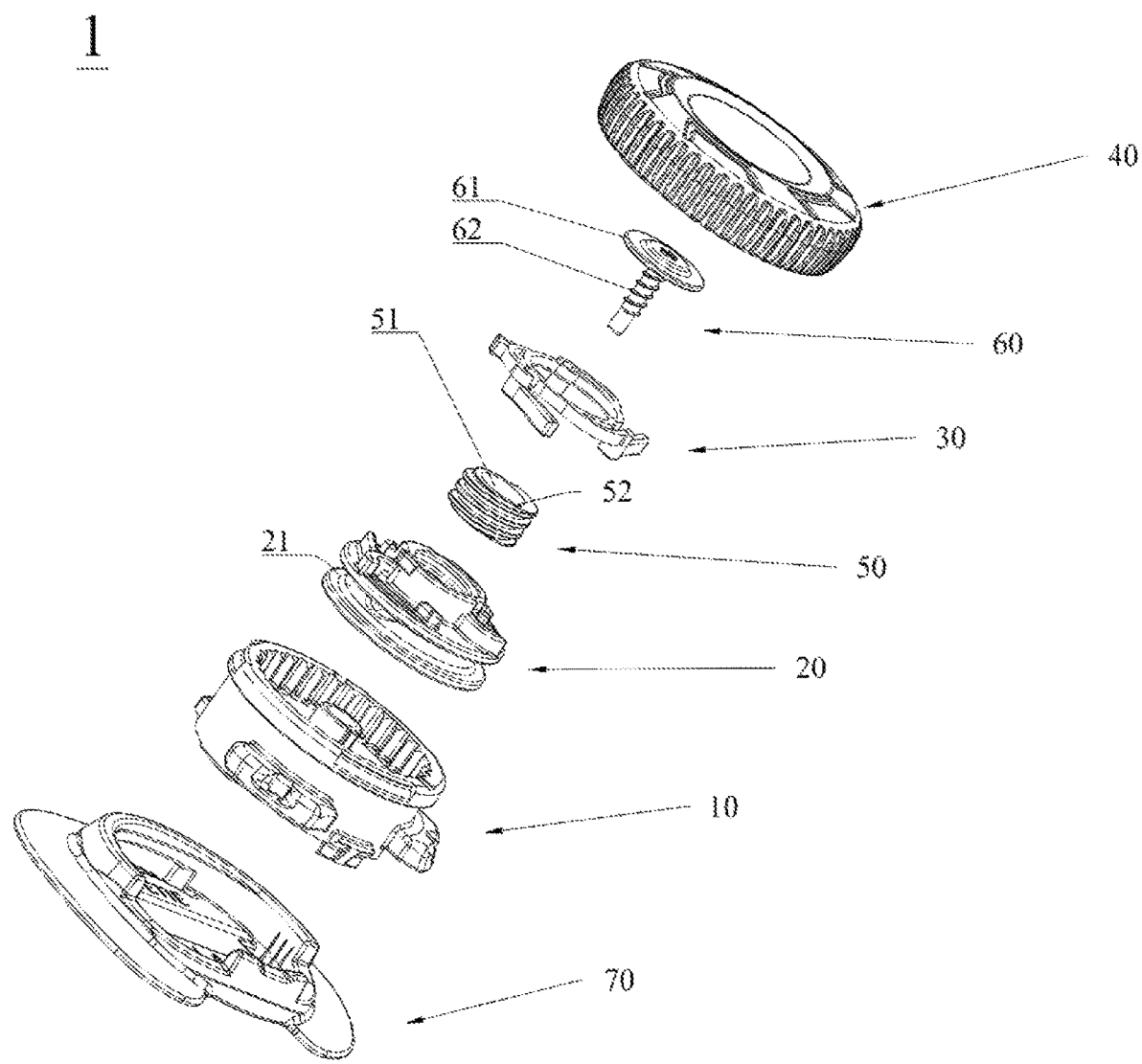
FIG. 2 is an exploded diagram of the finely-adjustable cord retracting and deploying device shown in FIG. 1.
Figure 3:
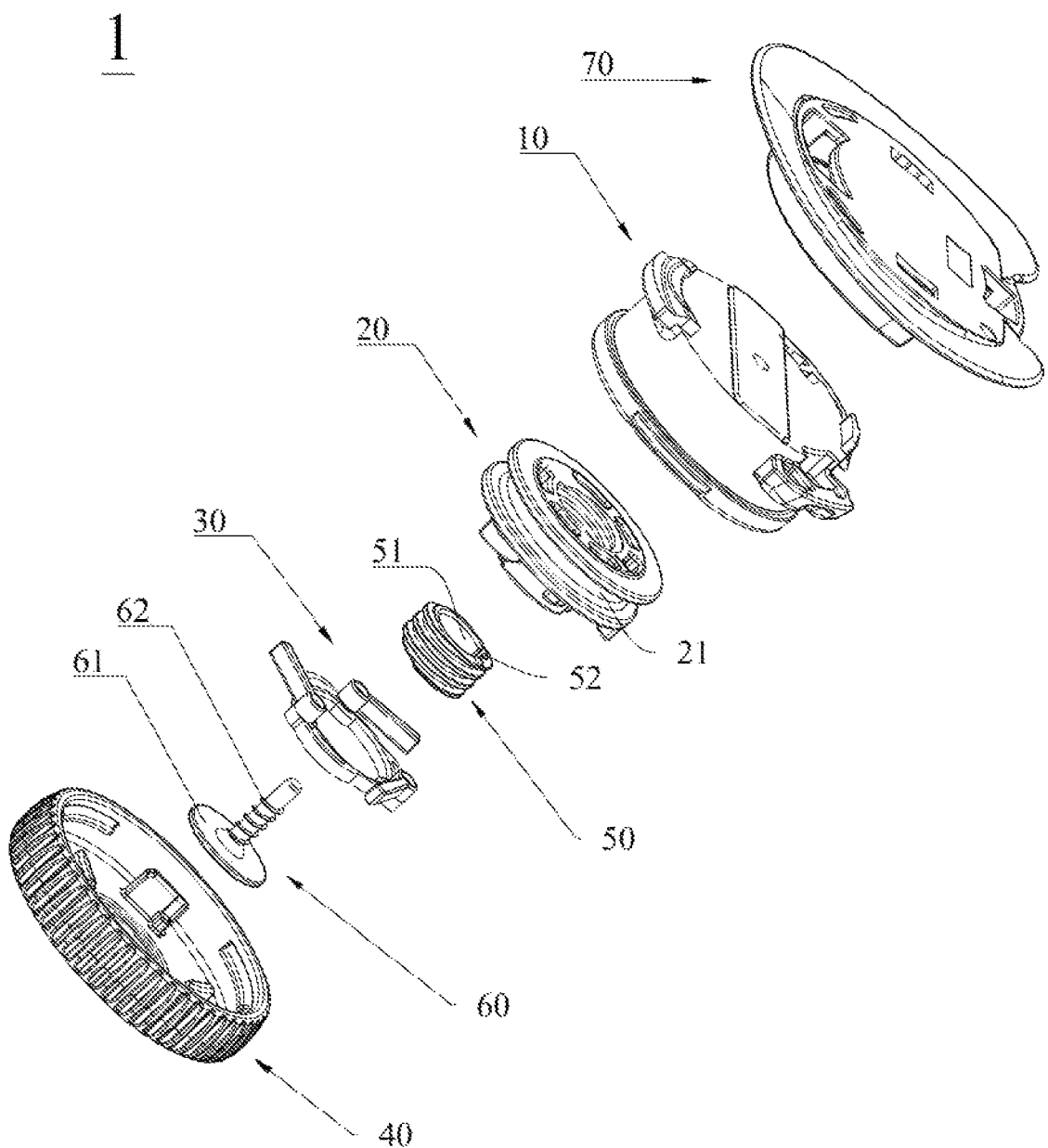
FIG. 3 is an exploded diagram of the finely-adjustable cord retracting and deploying device shown in FIG. 1 in another angle.

Referring to FIG. 2 and FIG. 3, the finely-adjustable cord retracting and deploying device 1 in the embodiments of the present disclosure includes a base 10, a reel 20, a pawl disk 30, a knob 40, and a control member 50.

Figure 4:
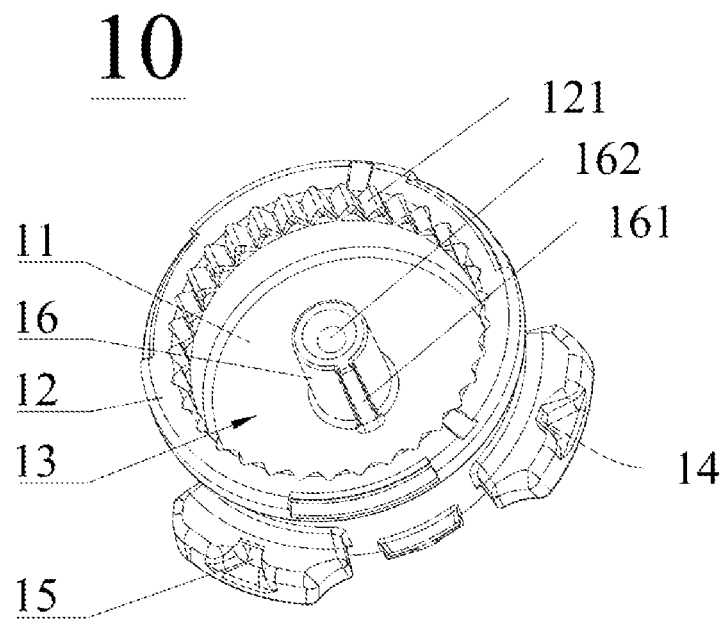
FIG. 4 is a schematic diagram of a base of the finely-adjustable cord retracting and deploying device shown in FIG. 1.
Figure 5:
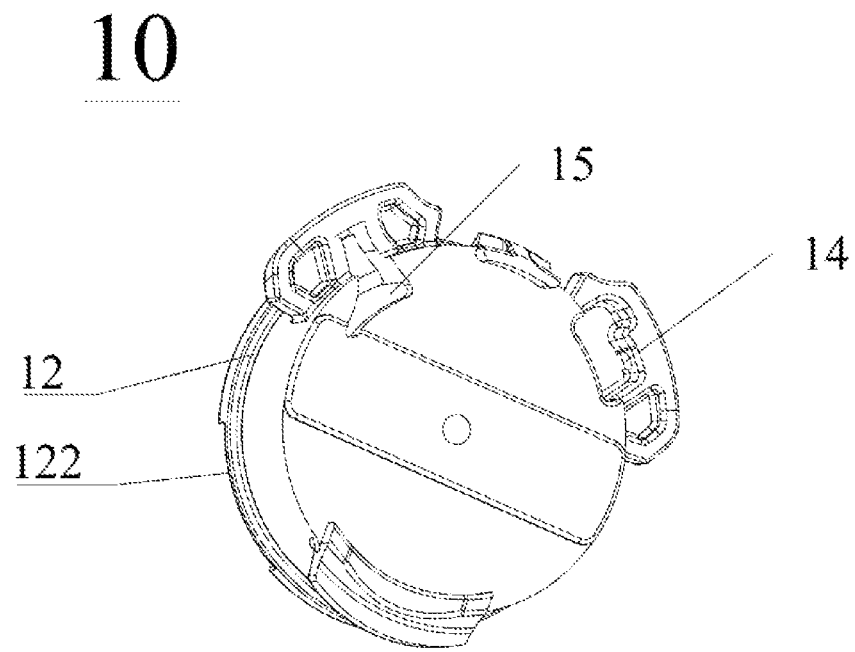
FIG. 5 is a schematic diagram of a base of the finely-adjustable cord retracting and deploying device shown in FIG. 1 in another angle.

Referring to FIG. 4 and FIG. 5, the base 10 includes a bottom plate 11 and a first side plate 12 arranged on one side of the bottom plate 11; the bottom plate 11 and the first side plate 12 are enclosed to form a first accommodating chamber 13; a ratchet part 121 is arranged at one end of the first side plate 12 away from the bottom plate 11; the ratchet part 121 is annularly arranged on the first side plate 12 and is located in the first accommodating chamber 13; the first side plate 12 is provided with a first threading hole 14 and a second threading hole 15 which are configured to thread a cord; and the second threading hole 15 is communicated to the first accommodating chamber 13.

The reel 20 is provided with a winding region 21 configured to store the cord, and the reel 20 is arranged in the first accommodating chamber 13 and is rotatably connected to the base 10. The pawl disk 30 is arranged in the first accommodating chamber 13 and is connected to the reel 20. The pawl disk 30 includes a pawl arm 31. The pawl arm 31 can move along the ratchet part 121 to control a length of retraction and deployment of the cord. When the pawl arm 31 resists against the ratchet part 121, the pawl disk 30 and the reel 20 are stationary relative to the base 10. When the pawl arm 31 is separated from the ratchet part 121, the pawl disk 30 and the reel 20 can rotate relative to the base 10. The knob 40 is arranged on one side of the base 10 facing the first accommodating chamber 13, and is rotatably connected to the base 10, which can rotate in a preset direction. The knob 40 includes a top plate 41 and a first driving member 42 arranged on one side of the top plate 41 facing the base 10. The first driving member 42 can drive the pawl arm 31 to be separated from the ratchet part 121 and drive the reel 20 to rotate relative to the base 10 to retract the cord into the winding region 21 or deploy the cord from the winding region 21. The control member 50 is arranged between the reel 20 and the base 10. The reel 20 is rotatably connected to the base 10 through the control member 50. When the knob 40 is turned in the preset direction, the control member 50 can move between the bottom plate 11 and the top plate 41 in a direction from the bottom plate 11 to the top plate 41 or from the top plate 41 to the bottom plate 11, so as to limit a rotation distance of the reel 20 and control a total length of retraction or deployment of the cord.

Specifically, in this embodiment, the first threading hole 14 is configured to fix one end of the cord, and a middle part of the cord passes through the second threading hole 15 to fix the other end of the cord on the reel 20. The end of the cord fixed at the first threading hole 14 needs to be knotted or sintered to avoid the cord from being separated from the first threading hole 14. Therefore, in this embodiment, a cavity configured to accommodate a knotted or sintered part of the cord is further arranged on one side of the first threading hole 14. Of course, in other embodiments, the first threading hole 14 can also be another structure that can fix one end of the cord, such as a fixing ring, a fixing hook, a pillar with a groove, or a nail, as long as it can fix one end of the cord.

Compared with the prior art, the finely-adjustable cord retracting and deploying device 1 provided by the present disclosure drives the reel 20 to rotate relative to the base 10 by turning the knob 40, thus retracting the cord into the winding region 21 or deploying the cord from the winding region 21. The pawl arm 31 and the ratchet part 121 are arranged in a mutually resisting and matching manner, so that the rotation distance of the reel 20 can be limited by the ratchet part 121 during rotation, thereby precisely controlling the length of the cord retracted or deployed by the reel 20. That is, for each turning of the knob 40, the reel 20 can retract or deploy the cord by a certain length. When the knob 40 is continuously turned, the reel 20 can continuously retract or deploy the cord. In addition, the control member 50 is arranged between the reel 20 and the base 10, and a total movement distance of the control member 50 is limited by the bottom plate 11 and the top plate 41, so as to control a total rotation distance of the reel 20 relative to the base 10, thereby controlling a total length of the cord during retraction or deployment. This can prevent the cord from getting stuck or deadly pressed in the winding region 21 when the cord is wound in the reel 20, so as to ensure smooth operation of the product every time the cord is retracted or deployed by a certain distance.

Continuing to refer to FIG. 2 to FIG. 5, a fixed column 16 is arranged on one side of the bottom plate 11 facing the first accommodating chamber 13; and a flange 161 is arranged on the fixed column 16. Specifically, the flange 161 is a convex bar protruding out of the fixed column 16. The convex bar extends in an axial direction of a periphery of the fixed column 16. In this embodiment, the control member 50 is a screw sleeve. The control member 50 is provided with a first mounting hole 51 and a limiting slot 52 communicated to the first mounting hole 51; when the first mounting hole 51 sleeves the fixed column 16, the flange 161 is located in the limiting slot 52; the control member 50 is further provided with an external thread; the reel 20 includes a main body part 22; a second mounting hole 221 provided with an internal thread is arranged on the main body part 22; the second mounting hole 221 is screwed to the control member 50; and when the knob 40 drives the reel 20 to rotate relative to the base 10, the reel 20 can drive the control member 50 to move in an axial direction of the fixed column 16. The control member 50 is connected to the fixed column 16 through the limiting slot 52 and the flange 161, thereby limiting the rotation of the control member 50 around the fixed column 16. Meanwhile, due to the fact that the control member 50 is screwed to the reel 20, when the reel 20 rotates around the fixed column 16, the control member 50 can only move in the axial direction of fixed column 16. When the control member 50 moves to the top plate 41 or the bottom plate 11 and cannot move, the reel 20 is unable to rotate around the fixed column 16. In this case, the cord cannot be retracted or deployed, thus precisely controlling the total length of retraction or deployment of the cord. In addition, the control member 50 using this structure has a simple structure and extremely high operation stability. The method for controlling the total length of the cord is simple, and the production process is also simple. Especially, rapid assembling can be achieved, the production costs are effectively reduced, and the competitiveness of the product is improved.

Figure 6:
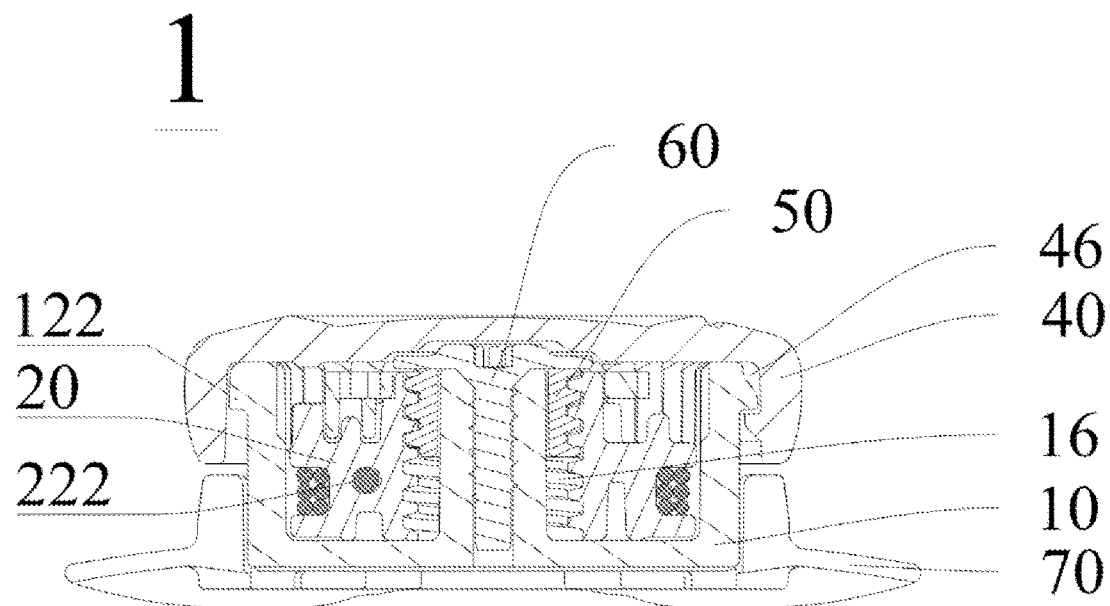
FIG. 6 is a cross-sectional view showing that the finely-adjustable cord retracting and deploying device shown in FIG. 1 is in a retracting state.
Figure 7:
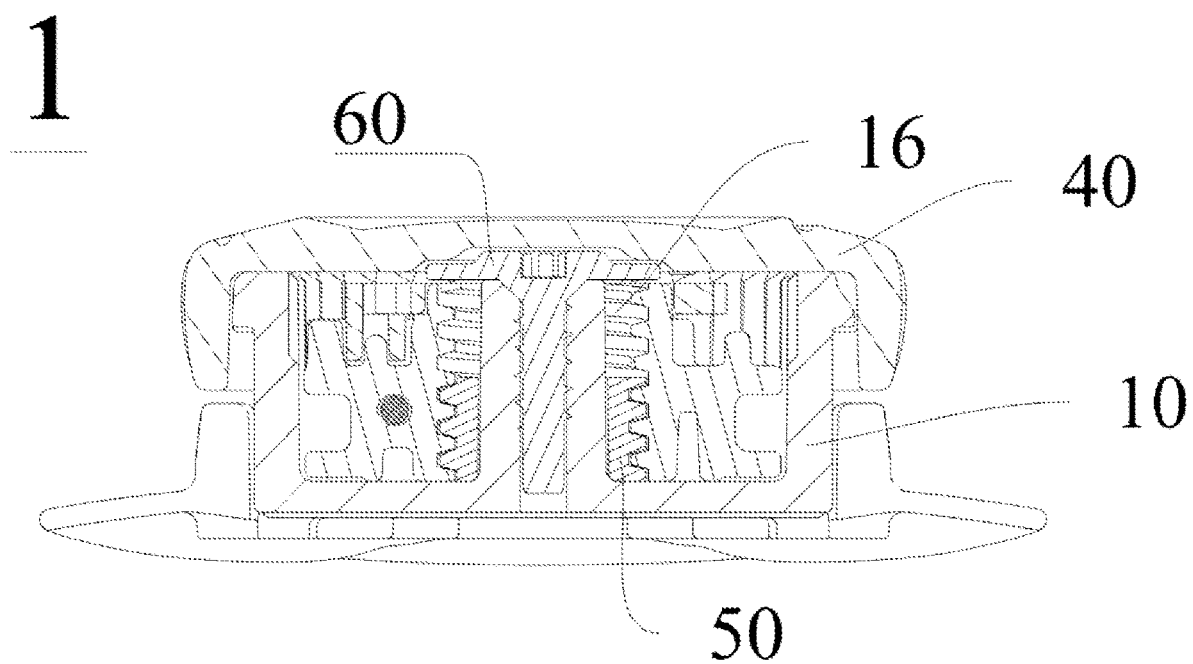
FIG. 7 is a cross-sectional view showing that the finely-adjustable cord retracting and deploying device shown in FIG. 1 is in a deploying state.

For the convenience of understanding, according to the finely-adjustable cord retracting and deploying device 1 provided in the embodiments of the present disclosure, the preset direction includes a first direction and a second direction. Specifically, the first direction and the second direction are two opposite directions. Based on a direction of facing up to the knob 40, in this embodiment, it is set that the first direction is a clockwise direction, and the second direction is an anticlockwise direction. When the knob 40 is turned in the clockwise direction, the reel 20 retracts the cord into the winding region 21. When the knob 40 is turned in the anticlockwise direction, the reel 20 deploys the cord. In this process, the control member 50 will move between the bottom plate 11 and the top plate 41 in the axial direction of the fixed column 16. For example, when the control member 50 resists against the bottom plate 11, the cord is deployed, but is not retracted into the reel 20. Referring to FIG. 6, FIG. 6 is a cross-sectional view showing that the finely-adjustable cord retracting and deploying device 1 shown in FIG. 1 is in a retracting state. When the knob 40 is turned in the clockwise direction until the cord is fully retracted to the reel 20, the control member 50 reaches one end of the fixed column 16 away from the bottom plate 11. When the cord needs to be deployed, the knob 40 is turned in the anticlockwise direction, and the cord is deployed. When the knob 40 is kept being turned anticlockwise until the cord is completely deployed, referring to FIG. 7, a cross-sectional view showing that the finely-adjustable cord retracting and deploying device shown in FIG. 1 is in a deploying state, the control member 50 resists against the bottom plate 11, and the cord is completely deployed. The finely-adjustable cord retracting and deploying device 1 in the embodiments of the present disclosure is provided with the control member 50, so that a total length of the cord that the reel 20 can accommodate when the cord is completely retracted or deployed can be determined according to the rotation distance of the reel 20 when the control member 50 moves in the axial direction of the fixed column 16. Therefore, the total length of the cord that the winding region 21 can accommodate during the design is greater than or equal to the total length of the retraction or deployment of the cord, so that when the product is used, the cord will be in a controllable state if the cord is retracted into the reel 20 or deployed from the reel 20. The phenomenon that the cord gets stuck or is deadly pressed on the reel 20 inside the product when the cord is precisely tightened or loosened is avoided. Thus, the fault rate of the product is reduced, and the quality of the product is ensured.

Figure 8:
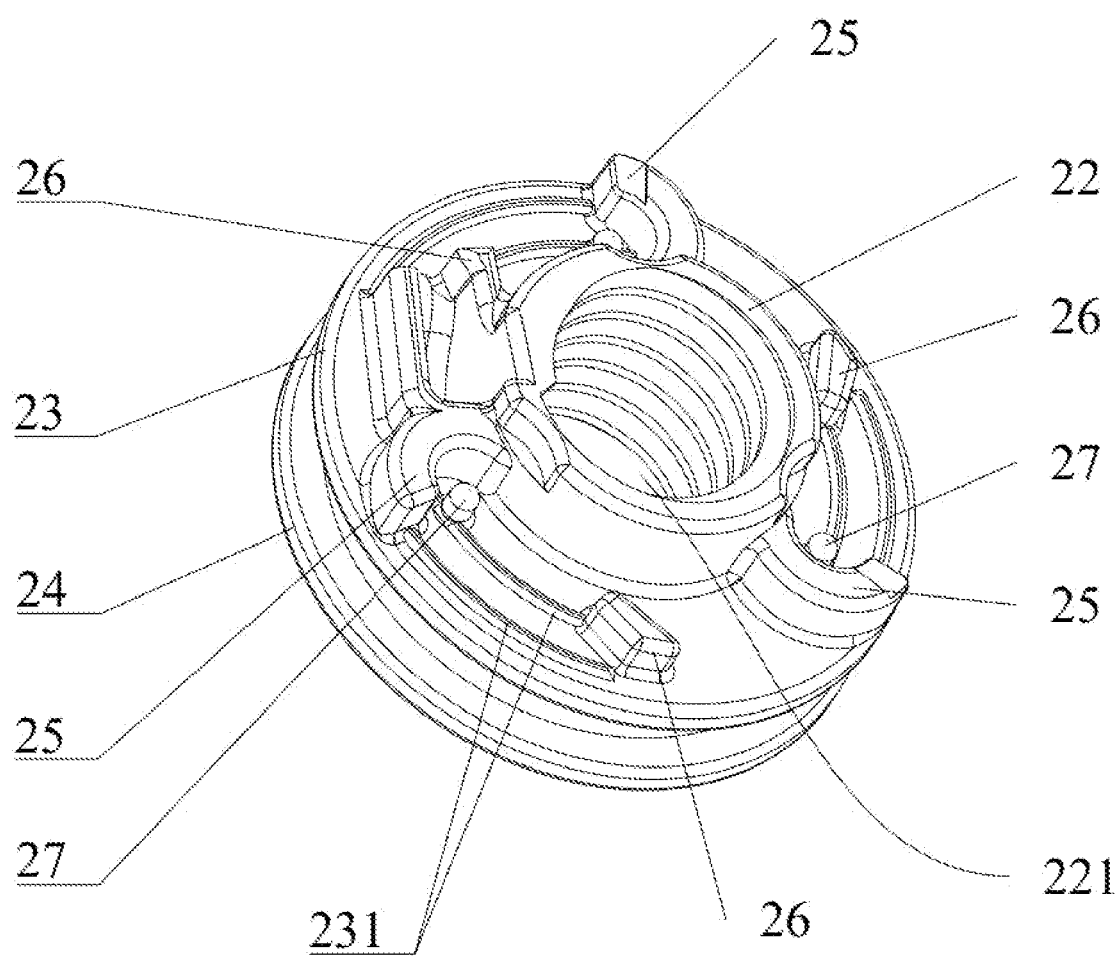
FIG. 8 is a schematic diagram of a reel of the finely-adjustable cord retracting and deploying device shown in FIG. 1.
Figure 9:
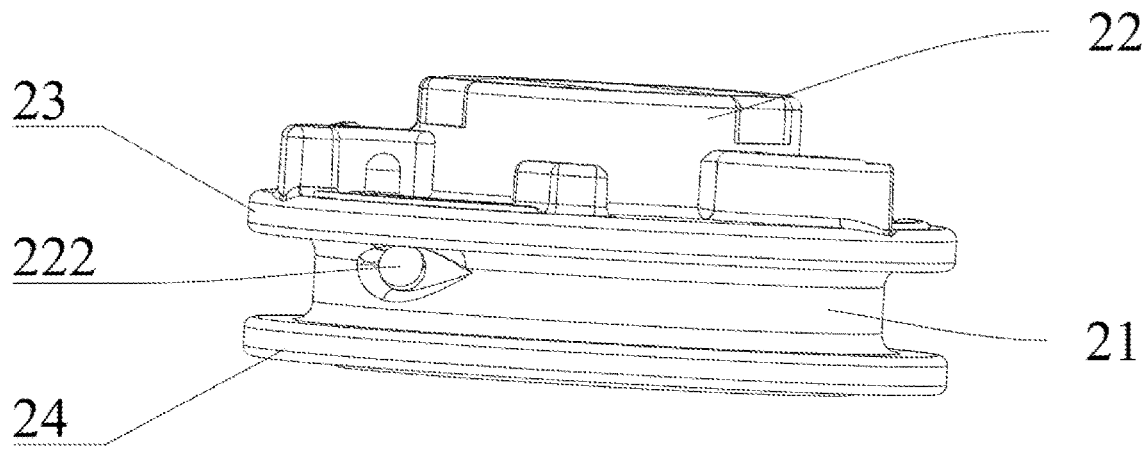
FIG. 9 is a schematic diagram of a reel of the finely-adjustable cord retracting and deploying device shown in FIG. 1 in another angle.

Referring to FIG. 8 and FIG. 9, the reel 20 further includes a first base plate 23 arranged on the main body part 22 and a second base plate 24 spaced apart from the first base plate 23; the first base plate 23, the second base plate 24, and the main body part 22 form the winding region 21; a third threading hole 222 configured to fix one end of the cord is arranged on the main body part 22 located in the winding region 21; the first thresholding hole 14 fixes the other end of the cord; and the cord is retracted to the winding region 21 or deployed from the winding region 21 via the second threading hole 15. It can be understood that the third threading hole 222 can also be another structure for fixing one end of the cord. The present disclosure takes the hole as an example for exemplification. The first base plate 23 and the second base plate 24 form the winding region 21, which can control the cord in a retraction region of the reel 20. Meanwhile, the third threading hole 222 for fixing the cord is arranged in the winding region 21, so that during the retraction of the cord, the cord can be directly retracted to the winding region 21.

Specifically, the second base plate 24 is located on the main body part 22 between the first base plate 23 and the bottom plate 11, and the third threading hole 222 passes through the main body part 22 of the winding region 21 and the first base plate 23. In this embodiment, the third threading hole 222 penetrates through the main body part 22 of the winding region 21 and the first base plate 23 to facilitate the mounting of the cord on the reel 20. Meanwhile, an accommodating chamber is arranged on one side of the first base plate 23 away from the second base plate 24 to conveniently accommodate the knotted or sintered part of an end portion of the cord, and an internal space of the product is also fully used. A second driving member 25 is arranged on one side of the first base plate 23 away from the second base plate 24; the first driving member 42 is located on one side of the second driving member 25 and resists against the first base plate 23; and the pawl arm 31 is located on one side of the first driving member 42 away from the second driving member 25 and resists against the first base plate 23.

Figure 10:
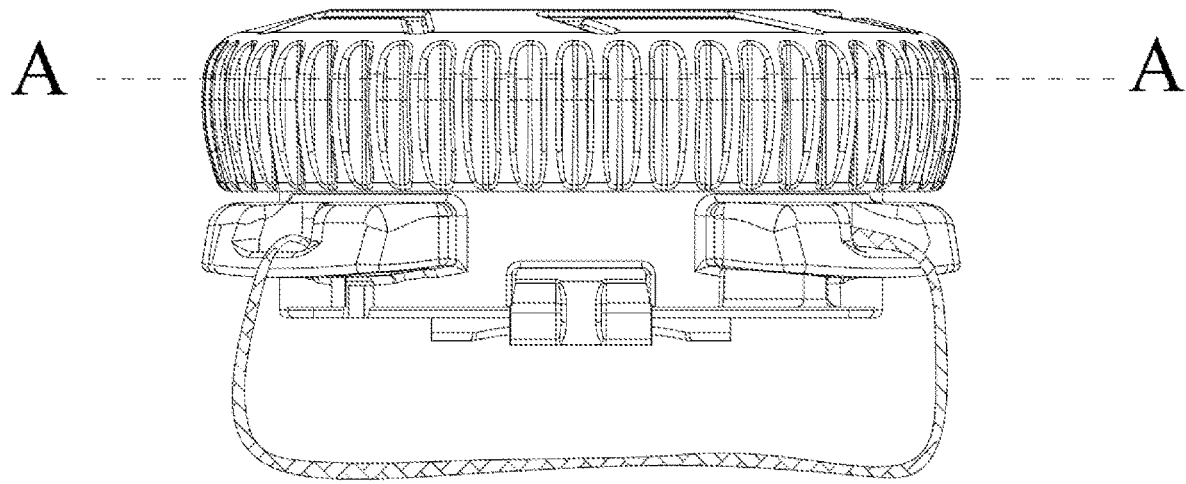
FIG. 10 is a three-dimensional diagram of the finely-adjustable cord retracting and deploying device shown in FIG. 1 in another angle.
Figure 11:
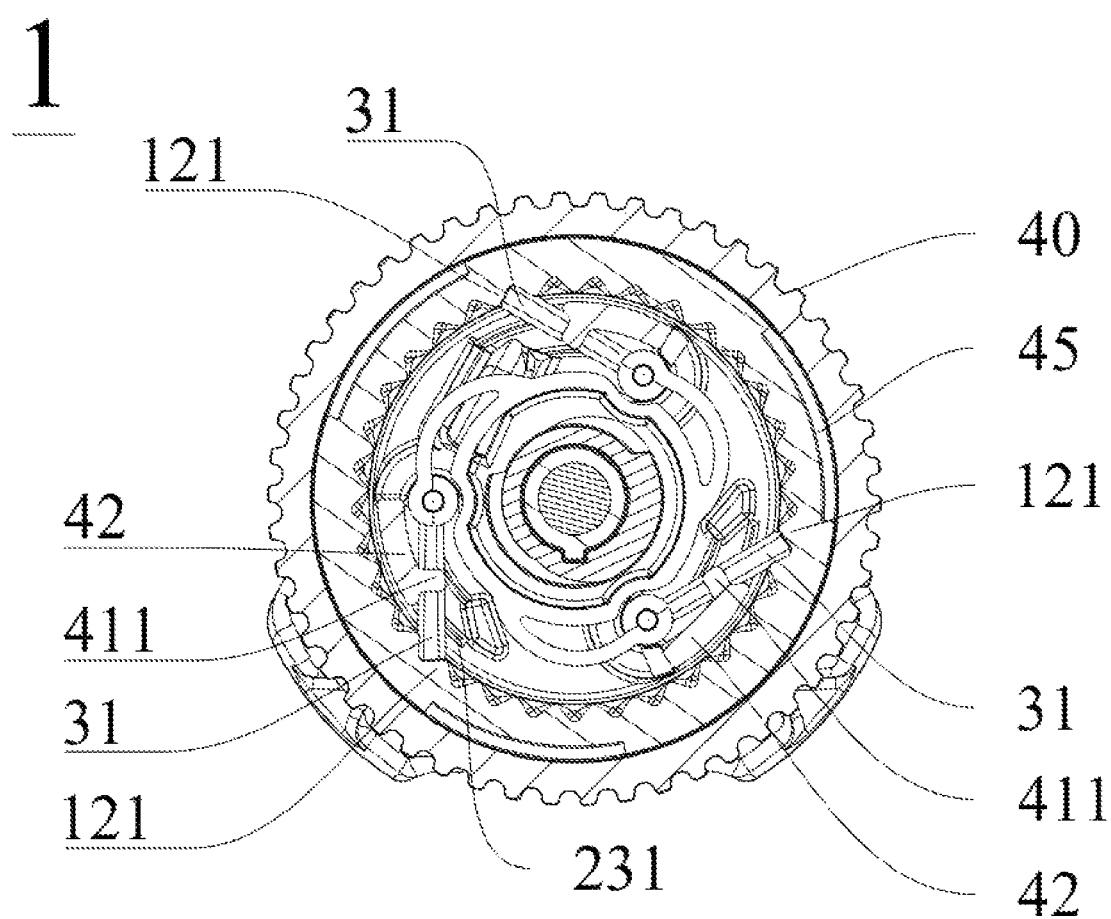
FIG. 11 is a cross-sectional view of the finely-adjustable cord retracting and deploying device shown in FIG. 10 along A-A.
Figure 12:
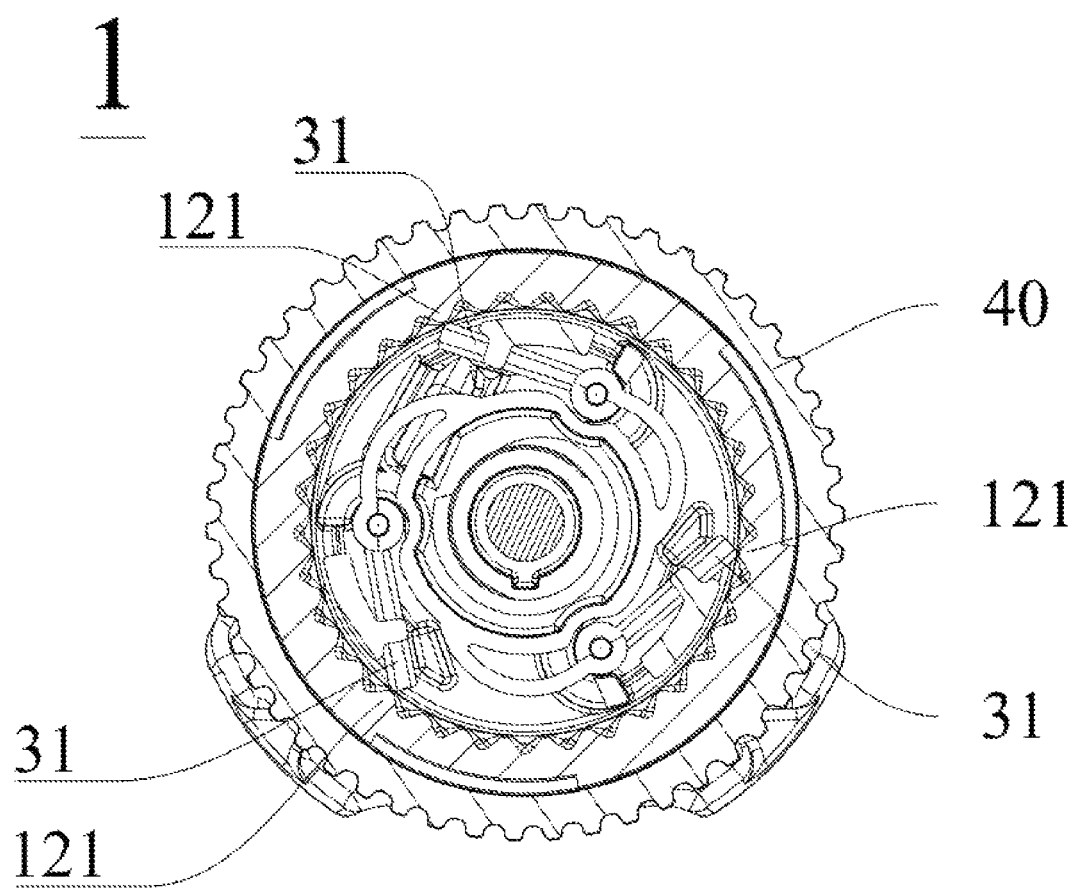
FIG. 12 is a cross-sectional view of the finely-adjustable cord retracting and deploying device shown in FIG. 10 along A-A in another state.

Referring to FIG. 10, FIG. 10 is a schematic diagram showing that the cord is deployed out of the product. Referring to FIG. 11 and FIG. 12 together, when the knob 40 is turned in the first direction, the first driving member 42 resists against and drives the second driving member 25 to drive the reel 20 to rotate around the fixed column 16 to retract the cord. When the knob 40 is turned in the second direction, the first driving member 42 resists against and drives the pawl arm 31 to drive the reel 20 to reversely rotate around the fixed column 16 to deploy the cord. When the knob 40 stops being turned, the pawl arm 31 resists against the ratchet part 121 to limit the rotation of the reel 20. The third threading hole 222 penetrates through the winding region 21 and the first base plate 23, so that the knotted part for fixing the cord can be arranged on the first base plate 23, which effectively uses the space. By the arrangement of the second driving member 25, it is more convenient and quicker for the first driving member 42 to drive the reel 20. Thus, turning the knob 40 can drive the reel 20.

To make the knob 40 better drive the reel 20, a third driving member 26 is further arranged on one side of the first base plate 23 away from the second base plate 24; the third driving member 26 is arranged on one side of the pawl arm 31 away from the first driving member 42; and when the knob 40 is turned in the second direction, the first driving member 42 resists against and drives the pawl arm 31, and the pawl arm 31 is separated from the ratchet part 121, and resists against and drives the third driving member 26 to drive the reel 20 to reversely rotate around the fixed column 16 to deploy the cord. By the arrangement of the third driving member 26, the first driving member 42 can indirectly drive the third driving member 26 by driving the pawl arm 31 when the knob 40 is turned in the second direction, thereby driving the reel 20 to rotate in the second direction to deploy the cord. This can avoid damage to the pawl arm 31 during the rotation in the second direction and prolong the service life of the product.

Figure 13:
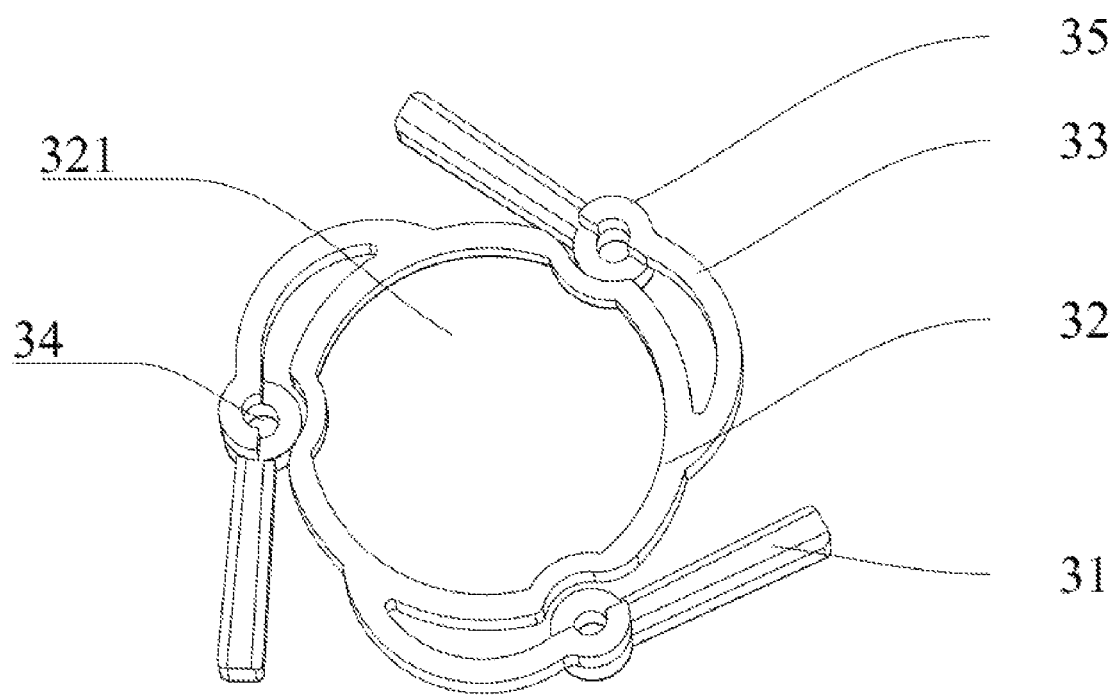
FIG. 13 is a schematic diagram of a pawl disk of the finely-adjustable cord retracting and deploying device shown in FIG. 1.

Referring to FIG. 13, the pawl disk 30 further includes a third base plate 32 provided with a mounting port 321, an elastic arm 33 connected to the third base plate 32, and a connecting part 35 connected to one end of the elastic arm 33 away from the third base plate 32 and is provided with a positioning hole 34; the third base plate 32 sleeves the main body part 22 through the mounting port 321; the pawl arm 31 is connected to one end of the connecting part 35 away from the elastic arm 33; one side of the first base plate 23 away from the second base plate 24 is further provided with a positioning column 27; the positioning column 27 is located between the second driving member 25 and the third driving member 26; and the positioning hole 34 sleeves the positioning column 27. By the arrangement of the third base plate 32 provided with the mounting port 321, and the positioning column 27, it can ensure a stable connection between the pawl disk 30 and the reel 20, and one of the reel 20 and the pawl disk 30 can push the other to rotate when driven. Meanwhile, the elastic arm 33 can also enable the pawl arm 31 to have certain elasticity, which can be separated from and resists against the ratchet part 121, thereby enabling the reel 20 to rotate or remain stationary relative to the base 10.

Specifically, a protruding part 231 is further arranged on one side of the first base plate 23 away from the second base plate 24; the protruding part 231 resists against the pawl arm 31; the second driving member 25 is arc-shaped; one end away from the first driving member 42 is connected to the main body part 22; and the positioning column 27 is arranged in an arc-shaped region of the second driving member 25. By the arrangement of the protruding part 231, a contact area between the pawl arm 31 and the first base plate 23 during deformation of the pawl arm can be reduced, thereby reducing a friction force. The positioning column 27 is arranged in the arc-shaped region of the second driving member 25, so that the pawl disk 30 is fixed more stably, avoiding its shaking from affecting the stability of the product.

Figure 14:
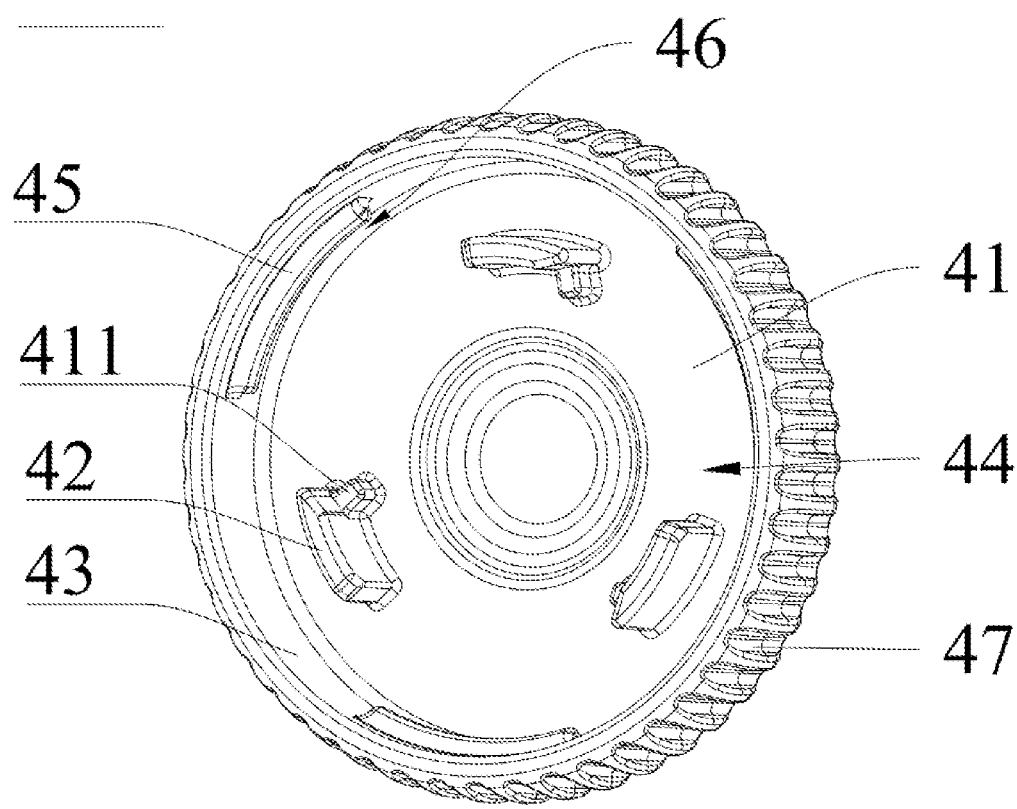
FIG. 14 is a schematic diagram of a knob of the finely-adjustable cord retracting and deploying device shown in FIG. 1.

Referring to FIG. 14, the knob 40 further includes a first limiting part 411 arranged on one side of the top plate 41 close to the bottom plate 11, and a second side plate 43 arranged in a circumferential direction of the top plate 41; the top plate 41 and the second side plate 43 are enclosed to form a second accommodating chamber 44; the first driving member 42 and the first limiting part 411 are located in the second accommodating chamber 44; the first limiting part 411 resists against the pawl arm 31; a second limiting part 45 is arranged on one side of the second side plate 43 facing the second accommodating chamber 44; the second limiting part 45, the second side plate 43, and the top plate 41 form a clamping slot 46; a clamping part 122 protruding out of the first side plate 12 is further arranged on one side of the first side plate 12 away from the first accommodating chamber 13; the clamping part 122 is clamped with the clamping slot 46; the clamping part 122 and the clamping slot 46 can slide relative to each other; a slope is further arranged on one side of the second limiting part 45 away from the top plate 41; and an anti-skid structure 47 is further arranged on one side of the second side plate 43 away from the second accommodating chamber 44. Specifically, the anti-skid structure 47 is an anti-skid texture. Of course, a marking arrow can also be arranged on one side of the top plate 41 away from the bottom plate 11 to indicate a direction of turning the knob 40 for the product to retract the cord. The first limiting part 411 resists against the pawl arm 31, which can prevent the pawl arm 31 from shaking up and down and improve the stability during the rotation of the product. The clamping slot 46 is clamped to the base 10, and the slope is arranged, which can facilitate the mounting of the product. Meanwhile, the relative rotation between the knob 40 and the base 10 can also be achieved. In addition, the anti-skid structure is arranged to facilitate the user to turn the knob 40, which improves the use experience.

Continuing to refer to FIG. 2 and FIG. 3, in the embodiments of the present disclosure, the finely-adjustable cord retracting and deploying device 1 further includes a fixing member 60; the fixing member 60 includes a limiting plate 61 and a screwing part 62 arranged on one side of the limiting plate 61; the fixed column 16 is provided with a fixing hole 162; the screwing part 62 is arranged in the fixing hole 162 in a penetrating manner; the limiting plate 61 resists against one end of the fixed column 16 away from the bottom plate 11; and when the knob 40 is turned to drive the reel 20 to rotate relative to the base 10, the reel 20 drives the control member 50 to move between the limiting plate 61 and the bottom plate 11 in an axial direction of the fixed column 16. The fixing member 60 is connected to the fixed column 16, which limits the axial movements of both the reel 20 and the pawl disk 30 on the fixed column 16, so that the reel and the pawl disk can only rotate around the fixed column 16. Furthermore, the fixing member 60 can also limit the movement of the control member 50 only between the bottom plate 11 and the fixing member 60, so as to avoid the influence of the control member 50 on the top plate 41 of the knob 40.

Specifically, the finely-adjustable cord retracting and deploying device 1 further includes a chassis 70; and the chassis 70 is located on one side of the base 10 away from the knob 40 and is fixed to the base 10. In this embodiment, the base 10 is fixedly connected to the chassis 70 through buckle connection. Of course, in other embodiments, the connection can also be achieved through screws or threads. The present disclosure will not limit this. By the arrangement of the chassis 70, the finely-adjustable cord retracting and deploying device 1 can be fixed on an object that needs to be used, so as to better use the finely-adjustable cord retracting and deploying device 1.

According to a second aspect, the present disclosure further provides a double-sided finely-adjustable cord retracting and deploying device, including the foregoing finely-adjustable cord retracting and deploying device 1, wherein the device includes two first threading holes 14 and two second threading holes 15 which are symmetrically arranged on the first side plate 12, so that the double-sided finely-adjustable cord retracting and deploying device simultaneously retracts or deploys the cord on two opposite sides. The two groups of the first threading holes 14 and second threading holes 15 are symmetrically arranged on the first side plate 12, so that two cords can be simultaneously arranged in a penetrating manner and are simultaneously retracted or deployed, and two kinds of objects can be simultaneously tightened or loosened.

According to a third aspect, referring to FIG. 15 to FIG. 19, the present disclosure further provides an object 3, including a first part 4, a second part 5, and a cord 6, wherein the cord 6 is configured to tighten or loosen the first part 4 and the second part 5; the object 3 further includes the foregoing finely-adjustable cord retracting and deploying device 1; and the finely-adjustable cord retracting and deploying device 1 is configured to retract and/or deploy the cord 6. In the embodiments of the present disclosure, the object 3 will be described by taking a shoe, a hat, a glove, a medical protective gear, and a retraction device as an example.

Figure 15:
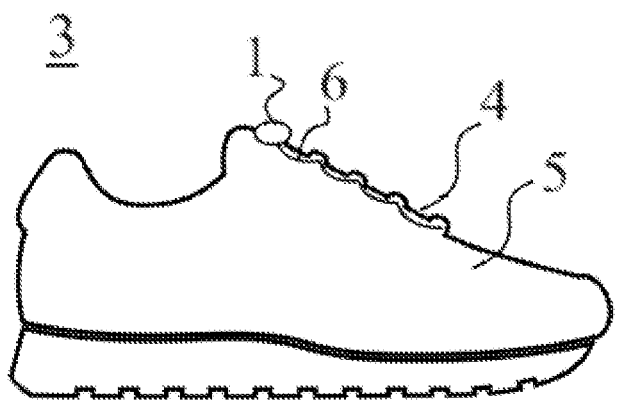
FIG. 15 is a schematic diagram of a structure of a shoe according to an embodiment of the present disclosure.

Specifically, FIG. 15 is a schematic diagram of a structure of a shoe according to an embodiment of the present disclosure. One side of the shoe is the first part 4, and the other side is the second part 5. There is a gap between the first part 4 and the second part 5, and the cord 6 passes through the first part 4 and the second part 5 to tighten or loosen the gap, thereby tying or loosening the shoe, and the cord 6 is retracted or deployed through the finely-adjustable cord retracting and deploying device 1.

Figure 16:
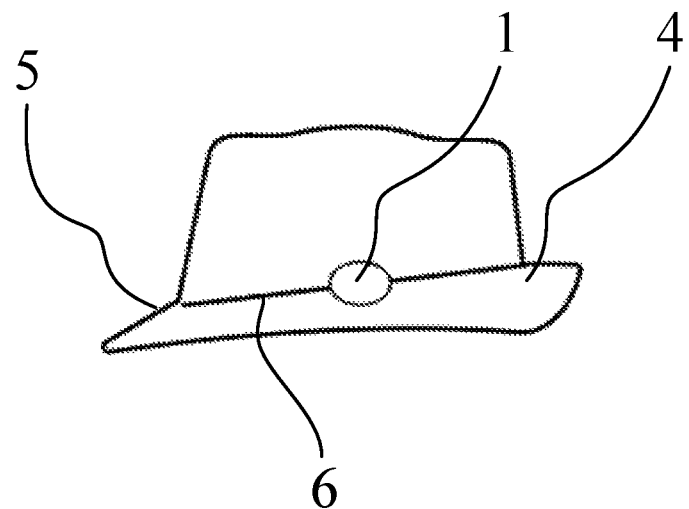
FIG. 16 is a schematic diagram of a structure of a hat according to an embodiment of the present disclosure.

FIG. 16 is a schematic diagram of a structure of a hat according to an embodiment of the present disclosure. One side of the hat is the first part 4, and the other side is the second part 5. The first part 4 and the second part 5 are connected to each other to form an opening through which the hat is worn on the head of a user. The cord 6 passes through the first part 4 and the second part 5 to tighten or loosen the opening, so that the cord 6 is retracted or deployed through the finely-adjustable cord retracting and deploying device 1, and the tightness of the hat on the head is adjusted.

Figure 17:
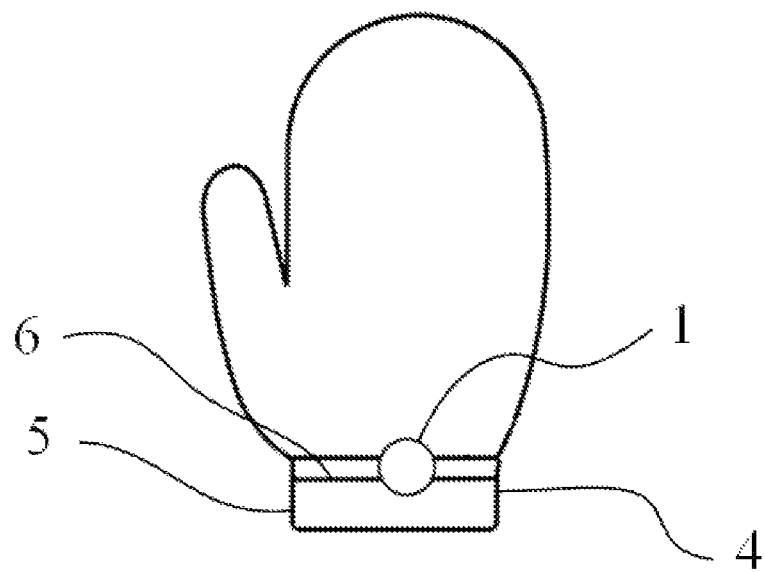
FIG. 17 is a schematic diagram of a structure of a glove according to an embodiment of the present disclosure.

FIG. 17 is a schematic diagram of a structure of a glove according to an embodiment of the present disclosure. One side of the glove is the first part 4, and the other side is the second part 5. The first part 4 and the second part 5 are connected to each other to form a glove opening through which the glove is worn on a hand of a user. The cord 6 passes through the first part 4 and the second part 5 to tighten or loosen the glove opening, so that the cord 6 is retracted or deployed through the finely-adjustable cord retracting and deploying device 1, and the tightness of the glove on the hand is adjusted.

Figure 18:
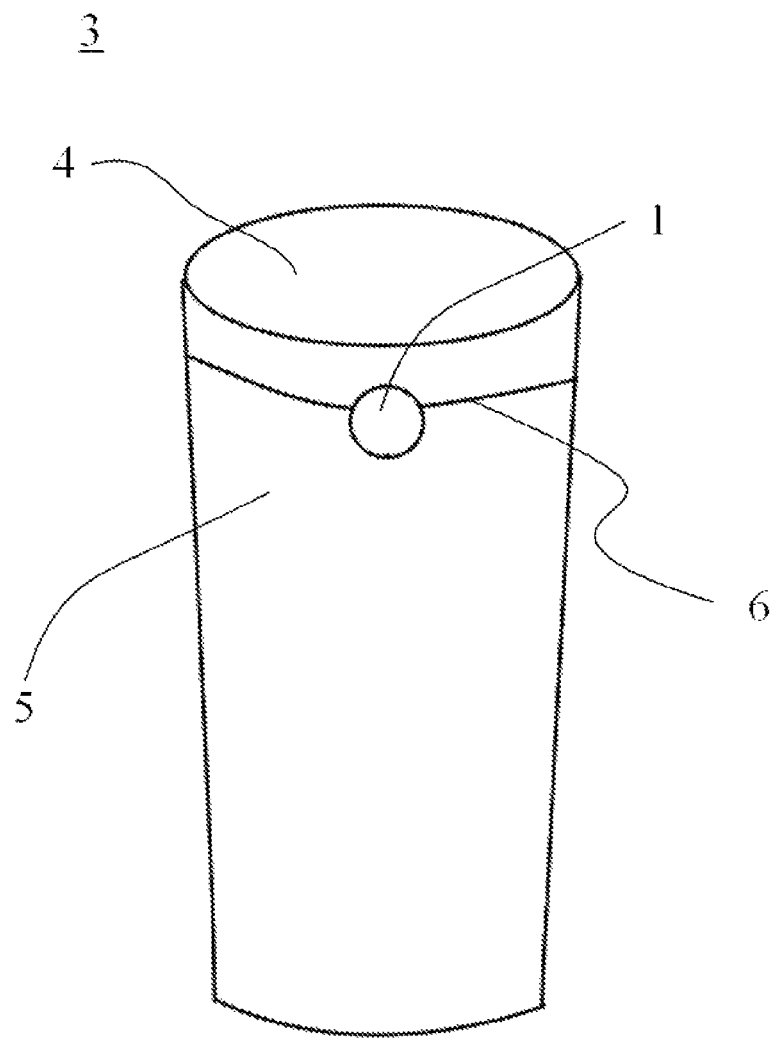
FIG. 18 is a schematic diagram of a structure of a medical protective gear according to an embodiment of the present disclosure.

FIG. 18 is a schematic diagram of a structure of a medical protective gear according to an embodiment of the present disclosure. One side of the medical protective gear is the first part 4, and the other side is the second part 5. There can be a gap between the first part 4 and the second part 5, or the first part and the second part can also be connected to each other. The medical protective gear can be worn at a limb part that needs to be protected or supported. The cord 6 passes through the first part 4 and the second part 5 to tighten or loosen the medical protective gear, and the cord 6 is retracted or deployed through the finely-adjustable cord retracting and deploying device 1, so that the tightness of the medical protective gear on the limb part is adjusted.

Figure 19:
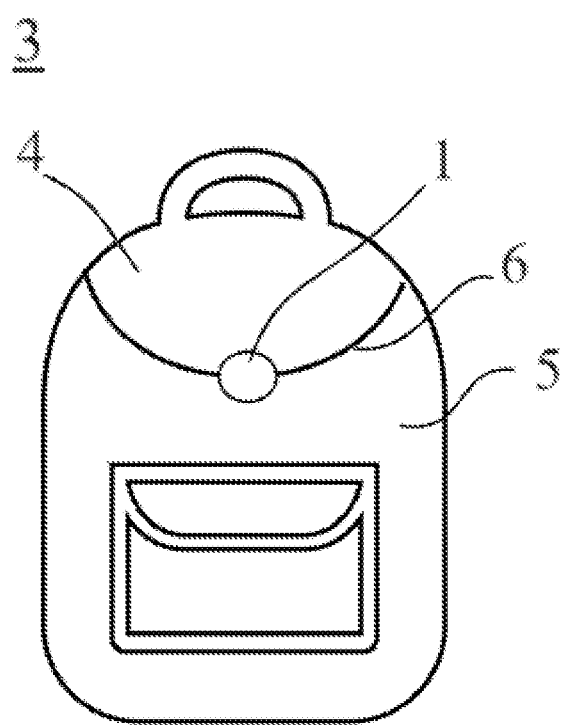
FIG. 19 is a schematic diagram of a structure of a retraction device according to an embodiment of the present disclosure.

FIG. 19 is a schematic diagram of the structure of a retraction device according to an embodiment of the present application. One side of the retraction device is the first part 4, and the other side is the second part 5. There may be a gap between the first part 4 and the second part 5, or the first part and the second part can be connected to each other to form an opening, as long as a retraction function is achieved. The cord 6 passes through the first part 4 and the second part 5 to tighten or loosen the retraction device, and the cord 6 is retracted or deployed through the finely-adjustable cord retracting and deploying device 1, so as to lock or unlock the retraction device. Of course, in other embodiments, the object 3 can also be another object that needs to be tightened or loosened with a cord. For example, the object 3 can also be a helmet, a skiing protective gear, a bag, clothing, and the like.

The various technical features in the foregoing embodiments may be randomly combined. For concise description, not all possible combinations of the various technical features in the above embodiments are described. However, provided that combinations of these technical features do not conflict with each other, the combinations of the various technical features are considered as falling within the scope of this specification. The foregoing embodiments merely express several implementations of the present disclosure. The descriptions thereof are relatively specific and detailed, but are not understood as limitations on the scope of the present disclosure. A person of ordinary skill in the art can also make several transformations and improvements without departing from the idea of this application. These transformations and improvements fall within the protection scope of this application. Therefore, the protection scope of the patent of this application shall be subject to the appended claims.

What is claimed is:

1. A finely-adjustable cord retracting and deploying device, comprising:
   a base, comprising a bottom plate and a first side plate arranged on one side of the bottom plate, wherein the bottom plate and the first side plate are enclosed to form a first accommodating chamber; a ratchet part is arranged at one end of the first side plate away from the bottom plate; the ratchet part is annularly arranged on the first side plate and is located in the first accommodating chamber; the first side plate is provided with a first threading hole and a second threading hole which are configured to thread a cord; the second threading hole is communicated to the first accommodating chamber;
   a reel, provided with a winding region configured to store the cord, wherein the reel is arranged in the first accommodating chamber and is rotatably connected to the base;
   a pawl disk, arranged in the first accommodating chamber and connected to the reel, wherein the pawl disk comprises a pawl arm; the pawl arm moves along the ratchet part to control a length of retraction and deployment of the cord; when the pawl arm resists against the ratchet part, the pawl disk and the reel are stationary relative to the base; when the pawl arm is separated from the ratchet part, the pawl disk and the reel rotate relative to the base;
   a knob, arranged on one side of the base facing the first accommodating chamber, rotatably connected to the base, and capable of being turned in a preset direction, wherein the knob comprises a top plate and a first driving member arranged on one side of the top plate facing the base; the first driving member drives the pawl arm to be separated from the ratchet part and drives the reel to rotate relative to the base, so as to retract or deploy the cord into or from the winding region; and a control member, arranged between the reel and the base, wherein the reel is rotatably connected to the base through the control member; and when the knob is turned in a first direction, the control member moves in a direction from the bottom plate to the top plate; and when the knob is turned in a second direction, the control member moves in a direction from the top plate to the bottom plate, movement of the control member to the bottom plate or the top plate is capable of preventing the knob from further rotation, so as to limit a rotation distance of the reel and control the length of the cord for retraction or deployment.

2. The finely-adjustable cord retracting and deploying device according to claim 1, wherein a fixed column is arranged on the one side of the bottom plate facing the first accommodating chamber; a flange is arranged on the fixed column; the control member is provided with a first mounting hole and a limiting slot communicated to the first mounting hole; when the first mounting hole sleeves the fixed column, the flange is located in the limiting slot; the control member is further provided with an external thread; the reel comprises a main body part; a second mounting hole provided with an internal thread is arranged on the main body part; the second mounting hole is screwed to the control member; and when the knob drives the reel to rotate relative to the base, the reel drives the control member to move in an axial direction of the fixed column.

3. The finely-adjustable cord retracting and deploying device according to claim 2, wherein the reel further comprises a first base plate arranged on the main body part and a second base plate spaced apart from the first base plate; the first base plate, the second base plate, and the main body part form the winding region; a third threading hole configured to fix one end of the cord is arranged on the main body part located in the winding region; the first threading hole fixes the other end of the cord; and the cord is retracted to the winding region or deployed from the winding region via the second threading hole.

4. The finely-adjustable cord retracting and deploying device according to claim 3, wherein the second base plate is located on the main body part between the first base plate and the bottom plate; the third threading hole passes through the main body part of the winding region and the first base plate; a second driving member is arranged on one side of the first base plate away from the second base plate; the first driving member is located on one side of the second driving member and resists against the first base plate; the pawl arm is located on one side of the first driving member away from the second driving member and resists against the first base plate; the preset direction comprises a first direction and a second direction; when the knob is turned in the first direction, the first driving member resists against and drives the second driving member to drive the reel to rotate around the fixed column to retract the cord; when the knob is turned in the second direction, the first driving member resists against and drives the pawl arm to drive the reel to reversely rotate around the fixed column to deploy the cord; and when the knob is stopped being turned, the pawl arm resists against the ratchet part to limit rotation of the reel.

5. The finely-adjustable cord retracting and deploying device according to claim 4, wherein a third driving member is further arranged on the one side of the first base plate away from the second base plate; the third driving member is arranged on one side of the pawl arm away from the first driving member; and when the knob is turned in the second direction, the first driving member resists against and drives the pawl arm, and the pawl arm is separated from the ratchet part, and resists against and drives the third driving member to drive the reel to reversely rotate around the fixed column to deploy the cord.

6. The finely-adjustable cord retracting and deploying device according to claim 5, wherein the pawl disk further comprises a third base plate provided with a mounting port, an elastic arm connected to the third base plate, and a connecting part connected to one end of the elastic arm away from the third base plate and is provided with a positioning hole; the third base plate sleeves the main body part through the mounting port; the pawl arm is connected to one end of the connecting part away from the elastic arm; the one side of the first base plate away from the second base plate is further provided with a positioning column; the positioning column is located between the second driving member and the third driving member; and the positioning hole sleeves the positioning column.

7. The finely-adjustable cord retracting and deploying device according to claim 6, wherein a protruding part is further arranged on the one side of the first base plate away from the second base plate; the protruding part resists against the pawl arm; the second driving member is arc-shaped; one end away from the first driving member is connected to the main body part; and the positioning column is arranged in an arc-shaped region of the second driving member.

8. The finely-adjustable cord retracting and deploying device according to claim 6, wherein the knob further comprises a first limiting part arranged on one side of the top plate close to the bottom plate, and a second side plate arranged in a circumferential direction of the top plate; the top plate and the second side plate are enclosed to form a second accommodating chamber; the first driving member and the first limiting part are located in the second accommodating chamber; the first limiting part resists against the pawl arm; a second limiting part is arranged on one side of the second side plate facing the second accommodating chamber; the second limiting part, the second side plate, and the top plate form a clamping slot; a clamping part protruding out of the first side plate is further arranged on one side of the first side plate away from the first accommodating chamber; the clamping part is clamped with the clamping slot; the clamping part and the clamping slot slide relative to each other; a slope is further arranged on one side of the second limiting part away from the top plate; and an anti-skid structure is further arranged on the one side of the second side plate away from the second accommodating chamber.

9. The finely-adjustable cord retracting and deploying device according to claim 2, wherein the finely-adjustable cord retracting and deploying device further comprises a fixing member; the fixing member comprises a limiting plate and a screwing part arranged on one side of the limiting plate; the fixed column is provided with a fixing hole; the screwing part is arranged in the fixing hole in a penetrating manner; the limiting plate resists against one end of the fixed column away from the bottom plate; and when the knob is turned to drive the reel to rotate relative to the base, the reel drives the control member to move between the limiting plate and the bottom plate in the axial direction of the fixed column.

10. The finely-adjustable cord retracting and deploying device according to claim 2, wherein the finely-adjustable cord retracting and deploying device further comprises a chassis; and the chassis is located on one side of the base away from the knob and is fixed to the base.

11. An object, comprising a first part, a second part, and a cord, wherein the cord is configured to tighten or loosen the first part and the second part; the object further comprises the finely-adjustable cord retracting and deploying device according to claim 1; and the finely-adjustable cord retracting and deploying device is configured to retract and/or deploy the cord.

12. The object according to claim 11, wherein the object is one of a shoe, a hat, a glove, a medical protective gear, a helmet, a retraction device, a skiing protective gear, a bag, and clothing.

13. The object according to claim 11, wherein a fixed column is arranged on one side of the bottom plate facing the first accommodating chamber; a flange is arranged on the fixed column; the control member is provided with a first mounting hole and a limiting slot communicated to the first mounting hole; when the first mounting hole sleeves the fixed column, the flange is located in the limiting slot; the control member is further provided with an external thread; the reel comprises a main body part; a second mounting hole provided with an internal thread is arranged on the main body part; the second mounting hole is screwed to the control member; and when the knob drives the reel to rotate relative to the base, the reel drives the control member to move in an axial direction of the fixed column.

* * * * *